US009268818B1

(12) United States Patent
Pattan et al.

(10) Patent No.: US 9,268,818 B1
(45) Date of Patent: Feb. 23, 2016

(54) DETERMINING INTENT OF A RECOMMENDATION ON A URL OF A WEB PAGE OR ADVERTISEMENT

(75) Inventors: Neha Pattan, Mountain View, CA (US); Jennifer W. Lin, San Jose, CA (US)

(73) Assignee: Google Inc., Mountain View, CA (US)

( * ) Notice: Subject to any disclaimer, the term of this patent is extended or adjusted under 35 U.S.C. 154(b) by 458 days.

(21) Appl. No.: 13/271,020

(22) Filed: Oct. 11, 2011

(51) Int. Cl.
*G06F 17/00* (2006.01)
*G06F 17/30* (2006.01)

(52) U.S. Cl.
CPC ................. *G06F 17/30525* (2013.01)

(58) Field of Classification Search
CPC ............. G06F 17/30979; G06F 17/30982; G06F 11/2023; G06F 11/2094; G06F 11/2097
USPC ........................................ 707/713
See application file for complete search history.

(56) References Cited

U.S. PATENT DOCUMENTS

| | | | |
|---|---|---|---|
| 7,925,620 B1* | 4/2011 | Yoon | 707/609 |
| 2008/0154915 A1* | 6/2008 | Flake et al. | 707/10 |
| 2010/0217670 A1 | 8/2010 | Reis et al. | |
| 2010/0332330 A1 | 12/2010 | Goel et al. | |
| 2011/0035350 A1* | 2/2011 | Zwol et al. | 706/52 |

* cited by examiner

*Primary Examiner* — Truong Vo
(74) *Attorney, Agent, or Firm* — Fish & Richardson P.C.

(57) ABSTRACT

Methods and systems are provided for presenting a user with a recommendation intent query in response to the user indicating that he or she recommends content. The recommendation intent query allows a user to designate (e.g., select, indicate, identify, choose, etc.) one or more components, subjects, characteristics, properties, etc., of the content to which the user's recommendation should be attributed. Therefore, the user's intent with regard to the recommendation can be determined, and a more detailed social annotation about the recommendation can be provided to other users in a social network. The recommendation intent query is in the form of a user interface containing a list of components, subjects, and characteristics of the recommended content, one or more of which may be designated by the user as being the intended target(s) of his or her recommendation.

38 Claims, 9 Drawing Sheets

| 505 | 510 | 515 | 520 | 525 | 530 |
|---|---|---|---|---|---|
| ID | Location | Discount | Business | Type | Image |
| Ad 1 | NY | 5% | Pizza | Banner | .gif |
| Ad 2 | DC | 50% | Magazines | Text | .jpg |
| Ad 3 | SF | 25% | Flowers | Search Results | .gif |
| Ad 4 | LA | 3rd Night Free | Hotel | Pop-up | .png |

FIG. 5A

| 540 | 545 | 550 | 555 | 560 |
|---|---|---|---|---|
| ID | Rating | Keyword | Name | Image |
| Page 1 | 4 stars | Hotel | Luxury Hotel | .gif |
| Page 2 | 2 stars | Bar | Old Pub | .png |
| Page 3 | --- | Car Rental | Easy Cars | --- |
| Page 4 | 3 stars | Cafe | Coffee Cup | .jpg |

FIG. 5B

DETERMINING INTENT OF A RECOMMENDATION ON A URL OF A WEB PAGE OR ADVERTISEMENT

FIELD OF THE INVENTION

The present disclosure generally relates to systems and methods for providing content to users. More specifically, aspects of the present disclosure relate to determining the intent of a user's interaction with social recommendation tools provided for display to the user in conjunction with content.

BACKGROUND

Content publishers, such as advertisers, are often limited in the amount of space that they can utilize to present content to a user at any given time. For example, an online advertiser may have specific dimensions (e.g., measured in centimeters, pixels, etc.) within which advertising material must be confined if it is to be presented to a user alongside a video being viewed, a game being played, in a search results listing, and the like. As such, content publishers often generate content that is made up of a number of different components selected to make full use of the available space while also conveying the intended information. For example, an online advertisement may contain a discount for a particular product or service being offered at some location or by some business, and may include a relevant image or video to better capture the user's attention.

A user who likes or enjoys certain content, such as an advertisement or a webpage, may wish to make his or her appreciation of the content known to one or more other users (e.g., in a social network of the user, or publicly). Accordingly, the user may make a recommendation of the ad or webpage that other users can see when they are presented with the same content. However, because such content often contains a variety of information, it can be difficult for advertisers to determine which component(s) of the content actually prompted the user to make the recommendation.

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

One embodiment of the present disclosure relates to a method for refining a content recommendation made by a user, the method comprising: receiving, at a server, an indication that a user recommended content, the content including a plurality of components; querying the user to select at least one of the plurality of components applicable to the recommendation; receiving from the user, in response to the query, a selection corresponding to at least one of the plurality of components; generating at least one social annotation based on the selection received from the user; and serving, via a network, the at least one social annotation to a computing device in a format suitable for presentation on the computing device in conjunction with the recommended content, the at least one social annotation identifying the at least one component of the content corresponding to the selection received from the user.

In another embodiment of the disclosure, the step of querying the user in the method for refining a content recommendation further includes, in response to receiving the indication that the user recommended the content, generating a user interface screen identifying the plurality of components of the content; and serving the user interface screen to a computing device in a format suitable for presentation to the user.

In another embodiment, the method for refining a content recommendation further includes receiving content for display to the user from at least one content publisher; and parsing the received content to identify components of the content.

In still another embodiment, the method for refining a content recommendation further includes generating at least one component reference table based on the parsed content, the at least one component reference table including the components identified from the parsed content; and storing the at least one component reference table.

In another embodiment, the method for refining a content recommendation further includes mapping the components included in the at least one component reference table to the content received for display from the at least one content publisher.

In yet another embodiment of the disclosure, the method for refining a content recommendation further includes, in response to receiving the indication that the user recommended the content, generating a user interface screen based on the mapped components included in the at least one component reference table stored for the recommended content, the user interface screen identifying the components of the recommended content; and using the user interface screen to query the user to select at least one of the components of the recommended content applicable to the recommendation.

Another embodiment of the present disclosure relates to a system comprising at least one processor, and a computer-readable medium coupled to the at least one processor having instructions stored thereon which, when executed by the at least one processor, causes the at least one processor to: receive an indication that a user recommended content, the content including a plurality of components; query the user to select at least one of the plurality of components applicable to the recommendation; receive from the user, in response to the query, a selection corresponding to at least one of the plurality of components; and generate at least one social annotation based on the selection received from the user.

In another embodiment, the at least one processor of the system is further caused to, in response to receiving the indication that the user recommended the content, generate a user interface screen identifying the plurality of components of the content; and provide the user interface screen for presentation to the user.

In another embodiment, the at least one processor of the system is further caused to receive content for display to the user from at least one content publisher; and parse the received content to identify components of the content.

In yet another embodiment, the at least one processor of the system is further caused to generate at least one component reference table based on the parsed content, the at least one component reference table including the components identified from the parsed content; and store the at least one component reference table.

In still another embodiment, the at least one processor of the system is further caused to map the components included in the at least one component reference table to the content received for display from the at least one content publisher.

In yet another embodiment, the at least one processor of the system is further caused to, in response to receiving the indication that the user recommended the content, generate a user interface screen based on the mapped components included in the at least one component reference table stored for the recommended content, the user interface screen identifying the components of the recommended content; and use the user interface screen to query the user to select at least one of the components of the recommended content applicable to the recommendation.

In another embodiment, the at least one processor of the system is further caused to provide the at least one social annotation for presentation to a second user in conjunction with the recommended content, the at least one social annotation identifying the at least one component of the content corresponding to the selection received from the user.

Still another embodiment of the present disclosure relates to a method for refining a content recommendation made by a user, the method comprising: receiving, at a server, an indication that a user recommended content, the content including a plurality of components; receiving data about at least one action of the user associated with the recommended content; determining that the recommendation applies to a specific one or more of the plurality of components based on the received data about the at least one action of the user; generating at least one social annotation based on the specific one or more of the plurality of components applicable to the recommendation; and serving, via a network, the at least one social annotation to a computing device in a format suitable for presentation on the computing device in conjunction with the recommended content, the at least one social annotation identifying the specific one or more of the plurality of components applicable to the recommendation.

Yet another embodiment of the present disclosure relates to a system comprising at least one processor, and a computer-readable medium coupled to the at least one processor having instructions stored thereon which, when executed by the at least one processor, causes the at least one processor to: receive an indication that a user recommended content, the content including a plurality of components; receive data about at least one action of the user associated with the recommended content; determine that the recommendation applies to a specific one or more of the plurality of components based on the received data about the at least one action of the user; and generate at least one social annotation based on the specific one or more of the plurality of components applicable to the recommendation.

In other embodiments of the disclosure, the methods and systems described herein may optionally include one or more of the following additional features: the at least one social annotation is served to the computing device for presentation to a second user in conjunction with the recommended content, the content includes one or both of a web page and a promotional content item, the indication that the user recommended the content is an indication that the user recommended a uniform resource locator (URL) associated with the content, the indication that the user recommended the content is an indication that the user selected a user recommendation control provided for presentation to the user in conjunction with the content, and/or the selection of the user recommendation control is an indication that the user approves the content.

Further scope of applicability of the present invention will become apparent from the Detailed Description given below. However, it should be understood that the Detailed Description and specific examples, while indicating preferred embodiments of the invention, are given by way of illustration only, since various changes and modifications within the spirit and scope of the invention will become apparent to those skilled in the art from this Detailed Description.

BRIEF DESCRIPTION OF DRAWINGS

These and other objects, features and characteristics of the present disclosure will become more apparent to those skilled in the art from a study of the following Detailed Description in conjunction with the appended claims and drawings, all of which form a part of this specification. In the drawings:

FIG. 5A is a chart illustrating example components of promotional content that may be used in generating a recommendation intent query for presentation to a user according to one or more embodiments described herein.

FIG. 5B is a chart illustrating example components of web page content that may be used in generating a recommendation intent query for presentation to a user according to one or more embodiments described herein.

Figure 1:
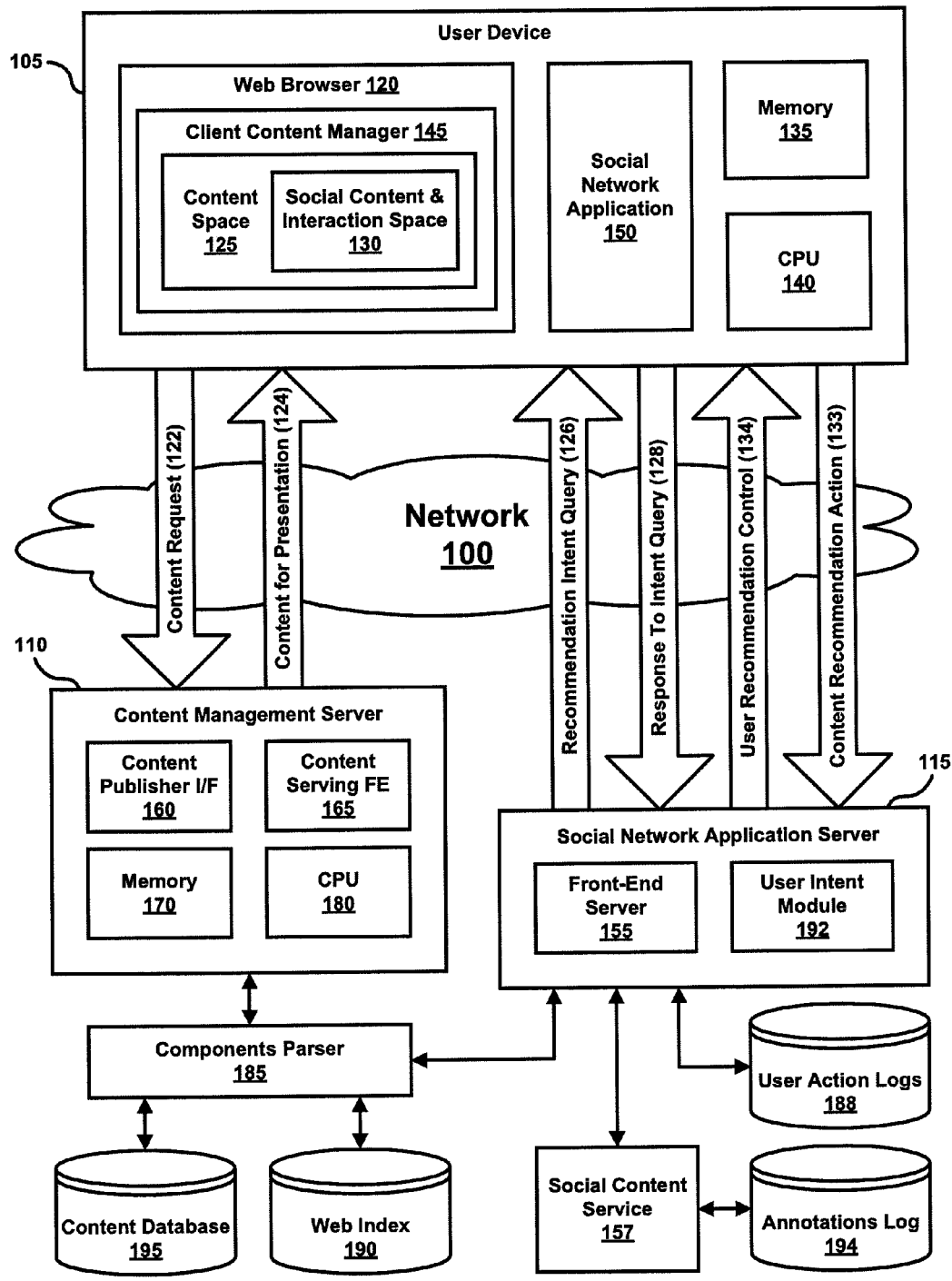
FIG. 1 is a block diagram illustrating an example content presentation system and surrounding environment in which various embodiments of the present disclosure may be implemented.

The headings provided herein are for convenience only and do not necessarily affect the scope or meaning of the claimed invention.

In the drawings, the same reference numerals and any acronyms identify elements or acts with the same or similar structure or functionality for ease of understanding and convenience. The drawings will be described in detail in the course of the following Detailed Description.

DETAILED DESCRIPTION

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other obvious features not described in detail herein. Additionally, some well-known structures or functions may not be shown or described in detail below, so as to avoid unnecessarily obscuring the relevant description.

Embodiments of the present disclosure relate to methods and systems for determining the intent of a user who makes a recommendation of content, where the recommendation can be attributed to one or more of a plurality of separable (e.g., distinguishable, separately identifiable, etc.) components, properties, subjects, and characteristics included in the content. The content can be, for example, an advertisement (sometimes referred to simply as an "ad") or a web page, and the separable content components, properties, subjects, and characteristics can include such things as an image, a discount or offer, a particular product or service, a format of the ad or of the image on the web page, and the like.

A user in a social network (e.g., an online community or system that provides a forum for users who are in different geographic locations to interact with each other) may wish to indicate that he or she likes, approves, suggests, or enjoys a particular content item (e.g., an ad or web page) such that one or more other users in the social network will be made aware of this indication when they are presented with the same content item. Accordingly, the user may make a recommendation of the content item.

In at least some embodiments of the present disclosure, a user can recommend content by interacting with a user recommendation control (e.g., widget, tool, point, button, etc.) provided for display to the user along with the content. This user recommendation control may be configured to allow a user to indicate, for example, that he or she recommends, likes, suggests, approves, or has some other opinion about the content. Depending on the implementation, the user recommendation control may be configured to allow a user to publish (e.g., make known to one or more other users in a social network and/or more broadly to the public in general) an opinion (e.g., emotion, reaction, perception, impression, view, etc.) that he or she has about the content.

In at least some scenarios a user's recommendation of content may be in the form of a recommended uniform resource locator (URL) that specifies the location of the content. For example, a user may recommend a URL of a web page or of an ad that the user finds enjoyable or helpful. While in some instances the user may intend for his or her recommendation to be for the entire web page or ad to which the URL points, in other instances the user's recommendation relates to a particular component (e.g., an image, a video, a portion of text, etc.), subject (e.g., Hawaii vacation, 5% discount, pizza, etc.), or characteristic (e.g., image is in Graphics Interchange Format (GIF) file format, the ad is a banner type ad, etc.) of the web page or ad. Such components, subjects, characteristics, properties, etc., are separable in the sense that they each contribute to the content as a whole in one or more ways.

As will be described in greater detail herein, embodiments of the present disclosure relate to providing a user with a recommendation intent query (also sometimes referred to as a "recommendation questionnaire") in response to the user indicating that he or she recommends an item of content. The recommendation intent query allows for a determination to be made about the user's intent with regard to the recommendation.

From an alternative perspective, the inventive techniques described herein allow a user to designate (e.g., select, indicate, identify, choose, etc.) one or more components, subjects, characteristics, properties, etc., of a content item to which the user's recommendation of the content applies or should be attributed.

For example, in at least some embodiments the recommendation intent query is in the form of a user interface containing a list of components, subjects, and characteristics of the recommended content, one or more of which may be designated by the user as being the intended target(s) of his or her recommendation. The following descriptions of various embodiments and examples sometimes collectively refer to the components, subjects, characteristics, features, properties, etc., of content as "content components" or simply "components," for purposes of brevity.

At least one embodiment described herein relates to parsing content, such as an advertisement or a web page, received from content publishers to create a database of content components that can be used (e.g., retrieved, referenced, etc.) to generate a recommendation intent query (e.g., recommendation questionnaire) for presentation to a user. As will be described in greater detail herein, each item of content received from a content publisher may be analyzed or parsed to identify various components comprising the content. For example, where the content item is an advertisement received from an advertiser, the advertisement may be parsed for components such as type of business, product/service, location, discount/offer, image/text, and so on. Similarly, where the content received is a web page, the web page may be parsed for images, keywords, ratings, etc. Received content items may be mapped to their respective parsed components and stored in one or more databases for use in generating a recommendation intent query.

In at least some embodiments, content received from content publishers is parsed using conventional parsing techniques. For example, content comprising a received web page or advertisement can be crawled (e.g., using a web crawler or other similar automated computer program capable of scanning, reading or "crawling" a web page, advertisement, and/or other such content to collect information contained therein) and keyword clusters derived therefrom for use in parsing the web page or advertisement. Additionally, in other embodiments the content publishers or advertisers can provide keywords (e.g., tags) along with the received content, which can be used to identify the various components comprising the content.

Other embodiments of the present disclosure relate to generating detailed social annotations for presentation with recommended content (e.g., a web page, an ad, etc.) based on a user's response to the recommendation intent query. For example, if a user designates a particular component, subject, property or characteristic of the content to which the user's recommendation of the content applies or is to be attributed, then when that same content is provided to other users in the user's social network (e.g., other users who are in some type of acquaintance relationship with the recommending user, such as the user's "connections," "friends," "circles," etc.), the content may be presented (e.g., on a display of a computer or other similar device) in conjunction with an annotation detailing the user's recommendation of the selected component, subject, property or characteristic.

The present disclosure contains some examples described in the context of advertisements. An advertisement is an entity (e.g., video, audio file, image, text, etc.) that presents a piece of information to a user and is designed to be used in whole or in part by the user. Ads can be provided (e.g., presented) to a user in electronic form, such as banner ads on a web page, as ads presented in a user interface associated with an application (e.g., a third-party application running on a user device), as ads presented with search results, as ads presented with emails, and the like. Such electronic ads may also contain links to other electronic content including web pages, images, audio files video files, etc. Advertisements may also be referred to as "promotional content" or one or more other similar such terms.

When a user makes a request for on-line content, such as a web page, a video/audio clip, a game, or other online resource, one or more content requests can be initiated to retrieve the requested content from content publishers for presentation to the user on a user device (e.g., personal computer, telephone, personal digital assistant (PDA), television system, etc.). Examples of content publishers include publishers of web sites, search engines that publish search results in response to a query, and numerous other sources or parties that make information and/or experiences available for presentation to a user. In some arrangements, one or more additional items of content, such as advertisements, may be provided along with the requested content. In such instances advertisers who provide the advertisements may also be considered content publishers.

In at least one scenario a user may be a member of a social network comprised of many other users, some of whom share a connection with the user or are in one of a variety of relations with the user. In such a social network context, a user may wish to recommend or suggest certain content, including advertisements, to one or more other social network users.

In at least some embodiments, the recommendation intent query provided for presentation to a user in response to receiving an indication that the user recommended an item of content (e.g., a web page, an ad, etc.) can be overlaid on the content being displayed. Depending on the implementation, the recommendation intent query can list or otherwise identify various components, subjects, properties and/or characteristics of the particular content that was recommended by the user (e.g., via a user recommendation control provided for presentation to the user in conjunction with the content). For example, the recommendation intent query can list components contained in the content, such as an image, a video, or a text description, and also include subjects pertinent to the content such as a discount amount being offered, a product and/or service that is being highlighted, a location relevant to the product and/or service, and so on. The recommendation intent query may also list properties or characteristics of the content being recommended, such as a type of advertisement (e.g., a banner ad, e-mail offer, etc.), a file format of an image contained in the content (e.g., GIF, JPG, etc.), and various other content properties.

It should be noted that the recommendation intent query described herein may be referred to in numerous other ways in addition to or instead of "recommendation intent query," without departing from its intended meaning and without limiting any of its features and/or functionalities. For example, the recommendation intent query may also be referred to as a "recommendation questionnaire," "user intent questionnaire," "user intent query", "user intent determination screen," as well as other identifiers, names and labels similar in nature to those mentioned. Irrespective of the term or phrase used to refer to the recommendation intent query, in the various embodiments described herein the recommendation intent query allows a user to designate (e.g., select, indicate, identify, choose, etc.) one or more components (e.g., subjects, characteristics, parts, features, properties, etc.) of a content item to which the user's recommendation of the content applies or should otherwise be attributed.

It should also be noted that while the examples provided in the present disclosure focus primarily on social recommendations made by a user of web pages and/or advertisements presented to the user as part of search results, such social recommendations and recommendation intent queries can also be used in other contexts and with other types of content, including websites, e-mails, or other resources provided by a content provider.

FIG. 1 shows an example content presentation system and surrounding environment in which various embodiments described herein may be implemented. The example system and environment shown includes a user device 105, a content management server 110, and a social network application server 115. The example environment also includes a network 100, such as a local area network (LAN), a wide area network (WAN), the Internet, or a combination thereof. The network 100 connects the user device 105, the content management server 110, the social network application server 115, and can also connect additional devices and/or servers of the same or different type (not shown). The example system also includes a components parser 185, a content database 195, a web index 190, a social content service 157, an annotations log 194, and user action logs 188. These and other components of the system and environment shown in FIG. 1 will be described in greater detail below.

In scenarios where the content presentation system of FIG. 1 is implemented in a more content-specific context, such as selecting and presenting advertisements, the content management server 110 may be referred to as an "ad management server," the content publisher interface 160 referred to as an "advertiser publisher interface," and the content serving front-end 165 referred to as an "ad serving front-end" without limiting any of the features or capabilities of these components or of the overall system as described herein. It should also be understood that while the following description of various features of the content presentation system sometimes makes reference to advertisements and/or web pages, other forms of content, including other forms of sponsored content, may also be selected and provided in the content presentation system.

The user device 105 can be any of a number of different electronic devices under control of a user and capable of requesting and receiving resources. As used herein, a resource is any data that can be provided over the network 100, and can be identified by a resource address associated with the resource. Examples of resources include images, video, HTML pages, content (e.g., words, phrases, images, etc.), embedded information such as meta-information and hyper-links, and also embedded instructions, such as JavaScript scripts. Examples of the user device 105 can be one or more personal computers, telephones, personal digital assistants (PDAs), television systems, etc., that are capable of sending and receiving data over the network 100. The user device 105 can also be a portable user device, such as a laptop computer, tablet computer, mobile communication device (e.g., cell phone, smartphone), and the like, capable of also sending and receiving data over the network 100.

The user device 105 may include one or more web browser tools 120 for viewing and interacting with web pages via a wired or wireless interne connection and/or via a mobile data exchange connection such as cellular, optical, near field communication, or some combination thereof. The web browser 120 may include a client content manager 145, designated content space 125, and designated social content and interaction space 130. The content space 125 may be for the display of various types of content, such as advertisements related to web page content, search results, web-based e-mail, and the like. The designated social content and interaction space 130 may be for the display of relevant social network content (e.g., social annotations provided to the user device 105 via a social network application 150) and various user interaction tools, such as a user recommendation control 134 that may be configured to allow a user to make a recommendation of content to other users in one or more social networks. In at least some embodiments, the user device 105 may also include a computer processing unit (CPU) 140, a memory 135, and a social network application 150. Further details regarding the social network application 150 and the user recommendation control 134 will be provided below.

The user device 105 may also include one or more applications (not shown), which in some embodiments may be third-party applications separate from (e.g., not associated or affiliated with) the social network application 150, the content management server 110, and the social network application server 115. These applications can consist of software that runs on the user device 105 and performs certain functions or tasks for a user, such as providing user interfaces for messaging services or providing services related to games, videos, or music. Such an application may also be a mobile application consisting of software designed to run on a mobile user device, such as a cell phone or smartphone. Some example types of applications include multimedia (e.g., video or audio players, graphic or image viewers, etc.), communication (e.g., news or information clients, messaging or e-mail clients, etc.), games, productivity (e.g., calculators, calendars, task managers, etc.), as well as numerous other categories and types. An application running on the user device 105 may similarly include a client content manager 145 and designated content space 125 for the display of content (e.g., web pages, ads, etc.) related to the application.

Content publishers, such as advertisers, may directly or indirectly submit, log, maintain, and utilize information in the content management server 110. For example, content publishers may access and/or interact with the content management server 110 via a content publisher interface (I/F) 160. Additionally, depending on the implementation, content publishers may be able to access and/or interact with the content management server 110 in one or more other ways. In at least some embodiments, advertisers can provide ads to the content management server 110 via the content publisher interface 160, and the content management server 110, in turn, can present the ads for presentation (illustrated more generally in FIG. 1 as content for presentation 124) to the user device 105 using various methods described in greater detail below. These ads may be presented to the user device 105 in response to a content (e.g., ad) request 122 received at the content management server 110, and may be in the form of graphical ads, such as banner ads, audio ads, video ads, still image ads, text-only ads, as well as ads combining one or more of any such forms. The content (e.g., ads) received at the content management server 110, and similarly provided to the user device 105 may also include embedded information or data, including links to one or more web pages, meta-information, and/or machine-executable instructions.

Although the client content manager 145 is illustrated in FIG. 1 as being a part of web browser 120, in some embodiments of the disclosure the client content manager 145 may be a logically separate unit from the web browser 120. Additionally, the client content manager 145 may become embedded within the web browser 120 and thus may form an integral part of the web browser 120. Similarly, in embodiments where the user device 105 contains one or more applications (not shown), the client content manager 145 may be contained or embedded within such applications or instead be a logically separate unit. The client content manager 145 manages content for the web browser 120, including sending content requests 122 to the content management server 110 and receiving content from the content management server 110 for presentation on (e.g., a display (not shown)) of the user device 105. In at least one embodiment, the web browser 120 may request content directly from the content management server 110, and also receive requested content from the content management server 110.

The social network application 150 may be client software running on the user device 105. In at least some embodiments, the social network application 150 manages a user's personal identification information (e.g., a personal cookie) and data regarding the user's accounts, including a social networking account. In one example, a social networking account is unique to a user, and represents the user for purposes of the user interacting with the content management server 110 and the social network application server 115, as well as for social networking.

In one or more embodiments, the social network application server 115 includes front-end server 155 and user intent module 192. The front-end server 155 may be configured to exchange data and information with social content service 157. In some arrangements, the data and information exchanged between the front-end server 155 and the social content service 157 may include social annotation information maintained in one or more social annotations logs 194. Additionally, the front-end server 155 may be configured to provide a recommendation intent query 126 from the social network application server 115 to the user device 105.

Furthermore, in at least one embodiment the user intent module 192 contained within the social network application server 115 is configured to receive from the user device 105 a response to the intent query 128, which may be a response to the recommendation intent query 126 sent to the user device 105 when, for example, a user makes a recommendation of content (e.g., by selecting or otherwise interacting with a user recommendation control 134 provided by the social network application server 115 to the user device 105 for presentation in conjunction with the content). Additionally, the user intent module 192 may be configured to receive one or more content recommendation actions 133 from the user device 105. In at least one example, a content recommendation action 133 may be an indication corresponding to a user's selection of the user recommendation control 134 provided to the user device 105 for presentation to the user in conjunction with content 124 provided by the content management server 110. As will be further described below, the social network application server 115 may also log one or more user actions (e.g., a user's sharing of a recommended content item with another user in a social network) in one or more user action logs 188.

The content management server 110 may also be in communication with a components parser 185. In at least some embodiments, the components parser 185 may be configured to parse content items received from content publishers (e.g., via the content publisher interface 160) using one or more conventional parsing techniques. For example, content comprising a web page or ad received at the content management server 110 can be crawled by the components parser 185, which may be configured as, or configured to implement, a web crawler or other similar automated computer program capable of scanning, reading or "crawling" such content.

The components parser 185 may crawl a web page, advertisement, and/or other such content to collect information contained therein and derive keyword clusters for use in parsing the content. The components parser 185 may store data corresponding to parsed content components in one or both of content database 195 and web index 190. As will be further described below, components of a content item parsed out by the components parser 185 may be used to generate the recommendation intent query 126 provided for presentation to a user in response to the user making a recommendation of the content item.

In some embodiments content publishers (e.g., advertisers) may supplement content items provided to the content management server 110 (e.g., via the content publisher interface 160) with additional information about the content. For example, an advertiser may provide information about one or more tags that can be used to identify various components of a particular advertisement served by the content management server 110 to the user device 105. In some arrangements these tags may be used to generate the recommendation intent query 126 that is provided for presentation to a user in response to the user making a recommendation of a content item (e.g., content recommendation action 133 from the user device 105 to the social network application server 115) being displayed on the user device 105.

In various embodiments described herein, content may be provided for presentation 124 in the web browser 120 of the user device 105 in conjunction with a user recommendation control 134 and one or more social annotations (not shown in FIG. 1). For example, the social network application server 115 may provide, for display with (e.g., as an overlay on) an item of content provided by the content management server 110, a user recommendation control 134 generated by a social content service 157. The social network application server 115 may be a web-application server, which is a front-end that hosts the social network application 150 running on the user device 105 and also the user recommendation control 134 provided to the user device 105. The social network application server 115 may be configured to exchange authentication credentials (e.g., content/ad share tokens) and user information with the social content service 157 such that the social content service 157 retrieves social annotations and other related social content and information from annotations log 194 for use in rendering the user recommendation control 134.

In any of the embodiments of the present disclosure, conventional content and/or ad serving methods and systems may be utilized in conjunction with the various features described herein. Additionally, in at least some embodiments, the content management server 110 identifies one or more candidate content items (e.g., candidate ads) from the content database 195, selects a particular one of the candidate content items, and provides the selected candidate content item to the user device 105 for presentation to a user. Depending on the implementation, the content management server 110 may conduct an auction (e.g., a "content auction" or an "ad auction") to determine which candidate content item will be selected for presentation.

It should be noted that in any of the various scenarios in which the methods or systems described herein collect personal information about a user, the user may be given the option to not have his or her personal information collected and/or used in any way. For example, a user may be provided with an opportunity to opt in/out of programs or features that may collect personal information, such as information about the user's geographic location, preferences, and the like. Furthermore, certain user data may be rendered anonymous in one or more ways before being stored and/or used, such that personally-identifiable information is removed. For example, a user's identity may be made anonymous so that no personally-identifiable information can be determined or collected for the user. Similarly, a user's geographic location may be generalized in situations where location information is obtained (e.g., limited to a city, zip code, or state level) so that a particular location of a user cannot be determined.

Figure 2:
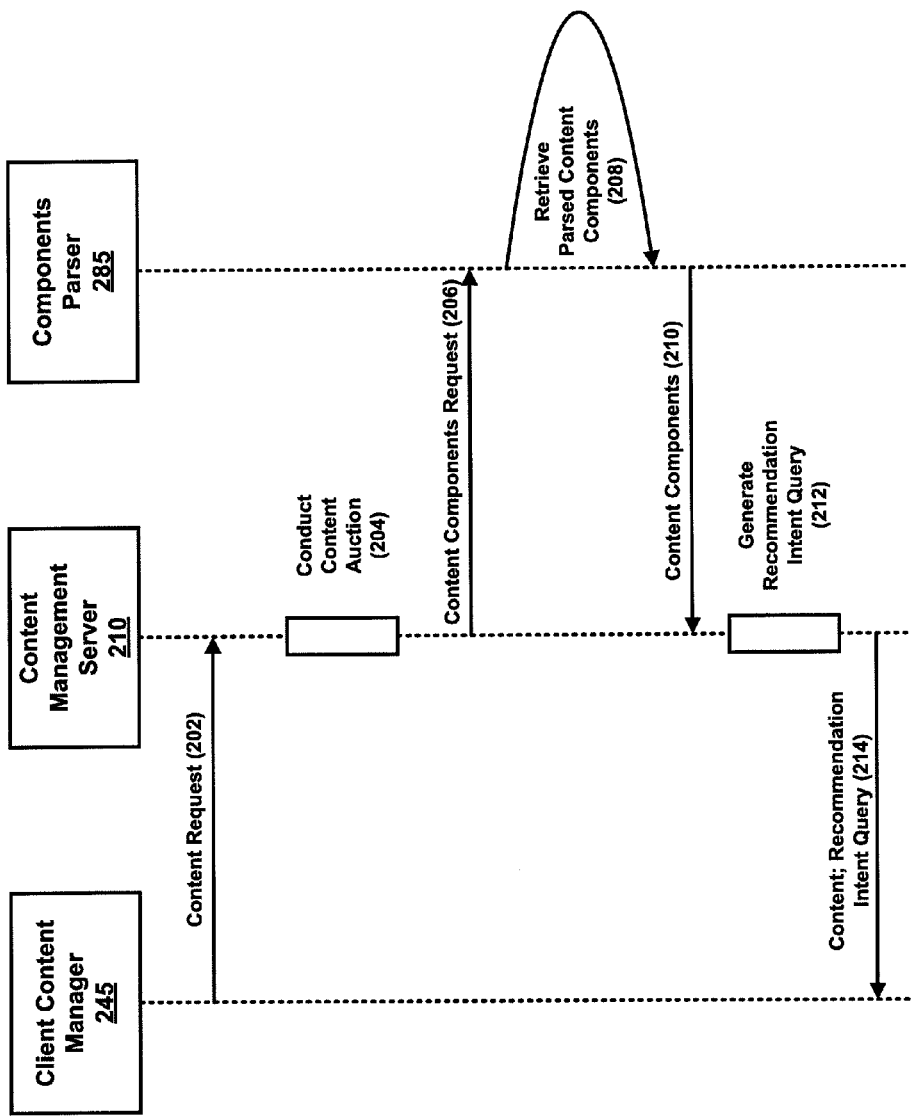
FIG. 2 is a data flow diagram illustrating example communications for generating and providing a recommendation intent query in conjunction with content according to one or more embodiments described herein.

FIG. 2 shows example communications, including data and information flows, for generating and providing a recommendation intent query (e.g., recommendation questionnaire) in conjunction with content (e.g., web page, advertisement, etc.) according to one or more embodiments described herein. Client content manager 245 sends a content request 202 to content management server 210. In at least one embodiment, the content request 202 may be sent from the client content manager 245 to the content management server 210 using hypertext transfer protocol (HTTP).

In at least some implementations, a user identifier (not shown in FIG. 2) may be sent to the content management server 210 along with the content request 202. If a user identifier is sent with the content request 202, then the identifier may be encrypted. In such an implementation, the content management server 210 (e.g., a content serving front-end component of the content management server, such as content serving front-end 165 of content management server 110 shown in FIG. 1) may be configured to decrypt the user identifier to make a determination as to whether the relevant user has "opted-out" (e.g., elected not to receive) of content associated with a social network (e.g., "social content"), which is the type of content involved in at least some embodiments of the present disclosure. For example, a user who does not wish to share his or her information, as well as information related to the user's friends within a social network of the user, may opt-out of receiving content (e.g., ads) accompanied by social network content (e.g., social annotations). In a scenario involving a user who has opted-out of social content, and thus chosen not to share his or her recommendations and suggestions, the user may or may not be presented with a recommendation intent query in response to making a recommendation, depending on the implementation.

Irrespective of whether the particular user has opted-out of social content, once the content management server 210 receives the content request 202 from the client content manager 245, the content management server 210 conducts a content auction 204 (e.g., an "ad auction" in the case of the content being an advertisement) to determine or select an item of content to be provided to the client content manager 245 for presentation to the user (e.g., on a display of a computer, television, and/or other similar such device).

Following the content auction 204, the content management server 210 may send a content components request 206 to components parser 285, where the content components request 206 is for the content item selected based on the content auction 204. In response to receiving the content components request 206, the components parser 285 may retrieve parsed content components 208 (e.g., data or information corresponding to the parsed content components) for the content item selected during the content auction, and return data for the requested content components 210 back to the content management server 210. In at least some embodiments, the components parser 285 may retrieve the data corresponding to the parsed content components 208 from a content database and/or a web index (e.g., content database 195 and/or web index 190 shown in FIG. 1).

Upon receiving the content components 210 (e.g., data or information corresponding to the content components parsed from the particular content item selected during the content auction 204) from the components parser 285, the content management server 210 may generate a recommendation intent query 212. In at least some embodiments, the recommendation intent query 212 generated by the content management server 110 is in the form of a user interface containing a list of components, subjects, properties, characteristics, etc. of the particular content item.

In the example embodiment shown in FIG. 2, the content management server 110 provides the recommendation intent query with the request content item 214 to the client content manager 245. In other embodiments, including a preferred embodiment illustrated in FIG. 3 and described in greater detail below, the recommendation intent query is instead provided to the client content manager by a social network application server (e.g., social network application server 115 shown in FIG. 1), and may further include the recommendation intent query being passed through a social network application (e.g., social network application 150 running on user device 105 shown in FIG. 1) before being received by the client content manager.

Figure 3:
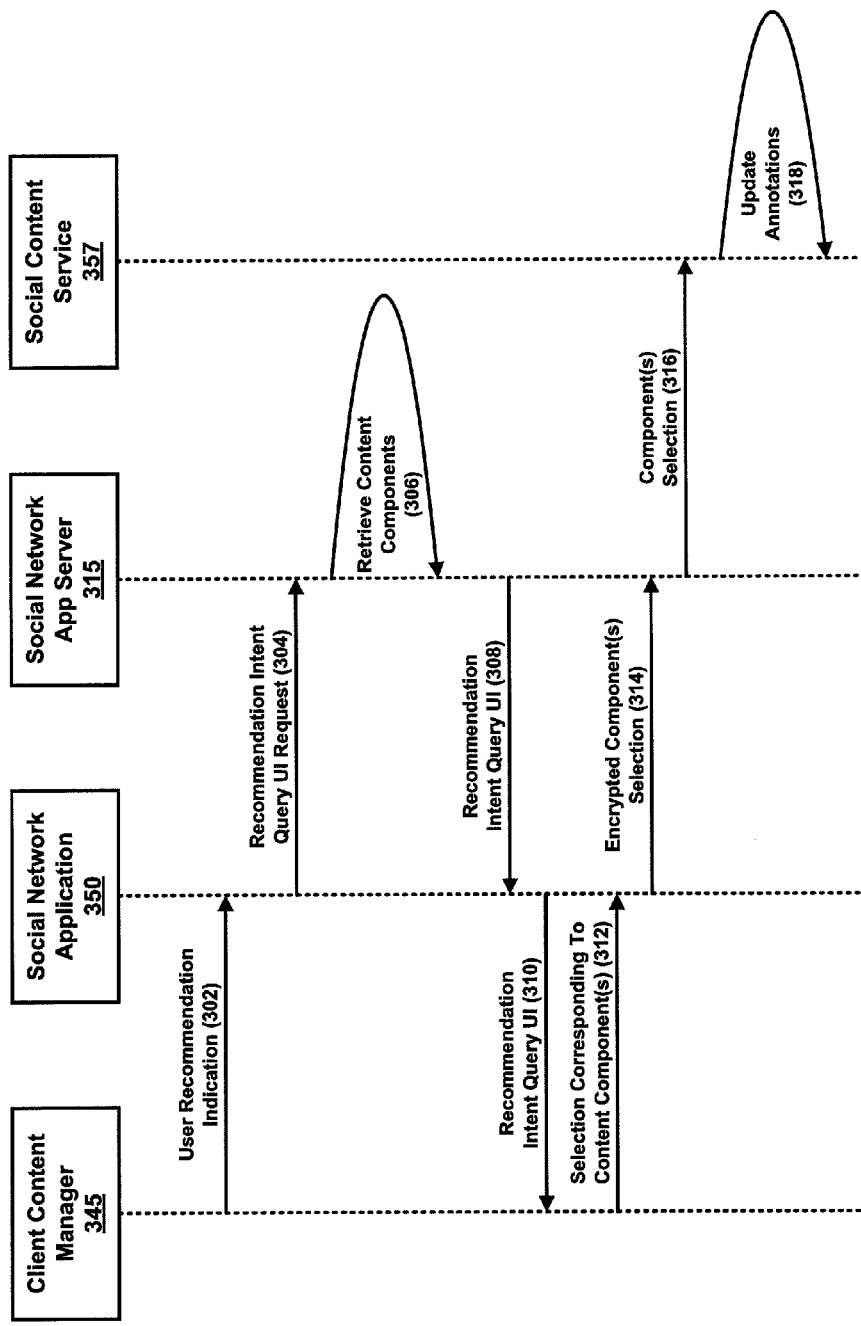
FIG. 3 is a data flow diagram illustrating example communications for refining a content recommendation made by a user according to one or more embodiments described herein.

FIG. 3 illustrates example communications, including data and information flows, for refining a content recommendation made by a user according to one or more embodiments described herein. As described above, in response to a user making a recommendation of content (e.g., content recommendation action 133 received at social network application server 115 shown in FIG. 1), the user may be presented with a recommendation intent query (e.g., recommendation intent query 126 provided by social network application server 115 to user device 105 shown in FIG. 1), which allows the user to make a selection corresponding to one or more components of the content that the user intended his or her recommendation to be for.

Client content manager 345, which in at least some embodiments may be a client module that manages content for a web browser contained on a user device (e.g., web browser 120 contained on user device 105 shown in FIG. 1) including sending requests for content and receiving content for presentation within the web browser, may send a user recommendation indication 302 to social network application 350. In at least some embodiments an indication that a user recommended content is an indication that the user selected a user recommendation control provided for presentation to the user in conjunction with the content (e.g., user recommendation control 134 provided by the social network application server 115 to the user device 105 shown in FIG. 1).

Upon receiving the user recommendation indication 302, the social network application 350, which may be client software running on a user device, may send a recommendation intent query user interface (UI) request 304 to social network application server 315. In response to receiving the request for a recommendation intent query UI 304, the social network application server 315 may retrieve content components 306 (e.g., data corresponding to the content components) for the item of content associated with the user recommendation indication 302 sent to the social network application 350 from the client content manager 345. In at least some embodiments, the social network application server 315 may retrieve data corresponding to the content components from a components parser (e.g., components parser 185 shown in FIG. 1) or a content database or web index (e.g., content database 195 and web index 190 shown in FIG. 1) in communication with such a components parser.

According to one or more embodiments of the present disclosure, the social network application server 315 may retrieve data corresponding to the components of a content item recommended by a user from one or more component reference tables stored for the content item, such as the example component reference tables shown in FIGS. 5A and 5B.

FIGS. 5A and 5B illustrate component reference tables including example components that may be parsed (e.g., by components parser 185 shown in FIG. 1) or otherwise identified from an item of content (e.g., a web page, advertisement, etc.), and used in generating a recommendation intent query (e.g., used by the social network application server 315 to generate recommendation intent query UI 308 provided to the social network application 350 shown in FIG. 3). In one or more embodiments, the components included in one or both of the component reference tables shown in FIGS. 5A and 5B may be populated into the tables based on tags (e.g., keywords) provided with content items by, for example, content publishers. Such tags may be used to identify the various separable components of a content item, where separable is used in the sense that each component contributes to the content item as a whole in one or more ways.

The example component reference table shown in FIG. 5A includes data and information for a plurality of promotional content items, each identified in the table by a unique identifier (ID) 505. The particular component reference table shown in FIG. 5A includes, for each of "Ad 1," "Ad 2," "Ad 3," and "Ad 4," data about a location 510, a discount 515, and a business 520 associated with the ad, as well as an ad type 525 and an image format 530 for any image(s) contained in the ad. It should be understood that numerous other components, characteristics, properties, subject-matter, and the like may also be included in the component reference table shown in FIG. 5A in addition to or instead of the example components described above, and that the example components illustrated and described are in no way intended to limit the scope of the disclosure.

The example component reference table shown in FIG. 5B includes various data and information for a plurality of web pages, each identified in the table by a unique identifier (ID) 540. The component reference table shown in FIG. 5B includes, for each of "Page 1," "Page 2," "Page 3," and "Page 4," data about a rating 545 given for the web page (e.g., by one or more users or visitors to the web page), a keyword 550 associated with the web page, a name of a product, business or service 555 related to the web page or to an advertisement included in the web page, as well as an image format 560 for any image(s) included in the content presented in the web page. It should be understood that numerous other components, characteristics, properties, subject-matter, and the like may also be included in the component reference table shown in FIG. 5B in addition to or instead of the example components described above, and that the example components illustrated and described are in no way intended to limit the scope of the disclosure.

Referring again to the example communications diagram shown in FIG. 3, upon retrieving the data corresponding to the content components 306 of a content item recommended by a user, the social network application server 315 may generate and provide a recommendation intent query UI 308 to the social network application 350. The social network application 350, in turn, provides the recommendation intent query UI 310 to the client content manager 345 for presentation to a user (e.g., the user who recommended the content item associated with the user recommendation indication 302). In at least some embodiments, the recommendation intent query UI 310 provided to the client content manager 345 contains list of components, subjects, properties, characteristics, etc. of the particular content item recommended by the user. Additional details regarding various features of the recommendation intent query UI will be described below with reference to FIG. 7.

The client content manager 345 sends a selection corresponding to one or more content components 312 of the recommended content to the social network application 350. These selection 312 received by the social network application 350 from the client content manager 345 corresponds to one or more content components contained in the recommendation intent query UI 310. In at least one embodiment, the social network application 350 encrypts the selection and sends the encrypted selection 314 to the social network application server 315, which decrypts the selection and sends the selected components 316 to social content service 357. Upon receiving the selected components 316, the social content service updates one or more social annotations 318 associated with the recommended content item and the user who made the recommendation.

Figure 4:
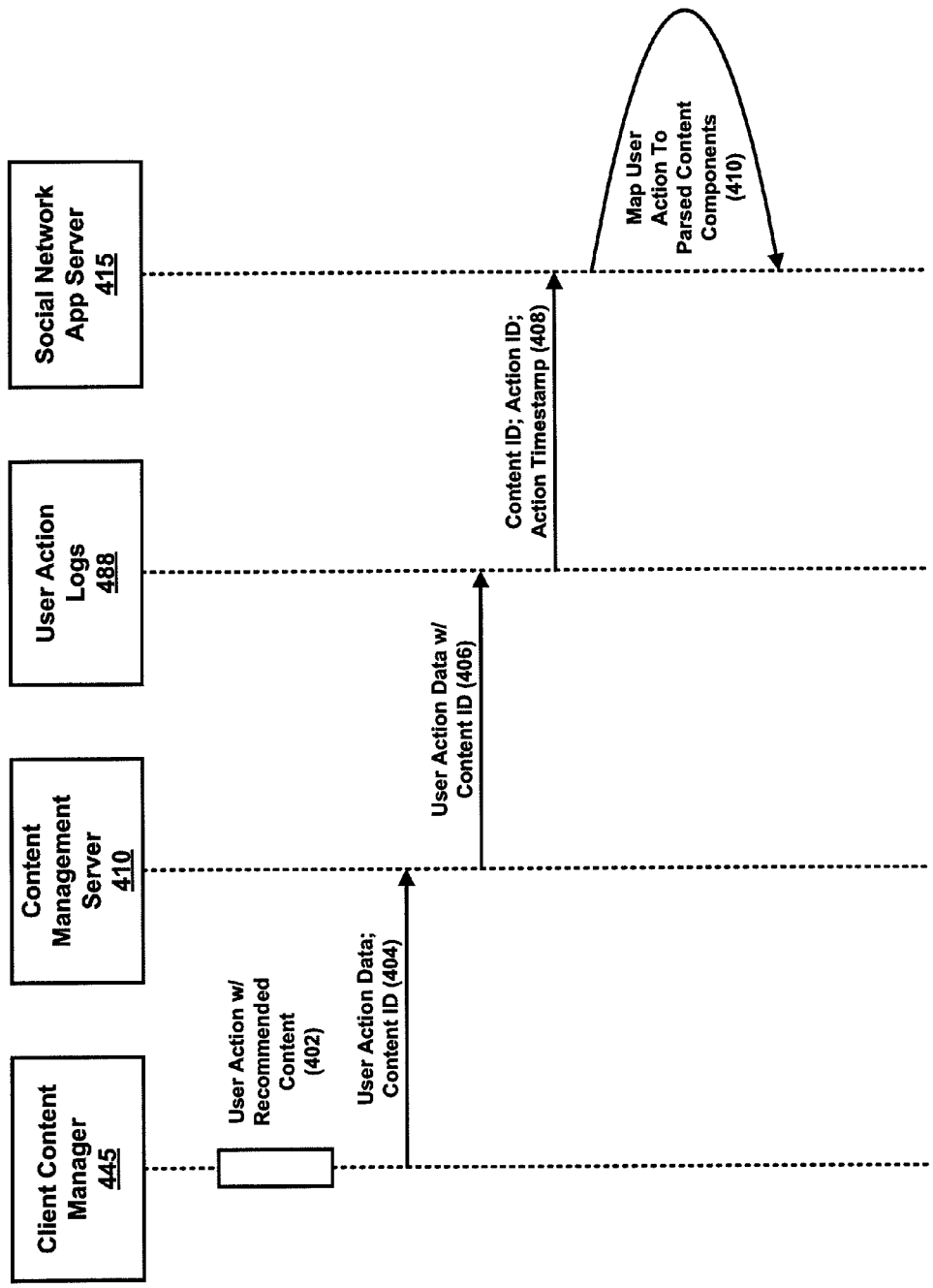
FIG. 4 is a data flow diagram illustrating example communications for receiving data about an action of a user and associating that action with a particular component of a content item according to one or more embodiments described herein.

FIG. 4 is a data flow diagram illustrating example communications for receiving data and information about one or more actions (e.g., activities) of a user and using the received data to associate those actions with one or more specific components of a recommended content item. In at least some scenarios, after a user makes a recommendation of content, the user may perform any of a variety of actions involving the recommended content.

For example, after a user recommends a web page (e.g., recommends a URL associated with a location of the web page) containing, for example, text, an image, a video, an advertisement, etc., the user may send an e-mail or post a message about the web page in which the user makes explicit mention about the image contained in the web page. In another example, following the user's recommendation of the same web page, the user may perform a conversion action (what constitutes a conversion action will vary depending on the particular content publisher or advertiser involved), such as purchasing a product shown in the advertisement. In each of these examples, information about the user's action(s) following the user's recommendation of the content may be used to determine which one or more components of the content the recommendation applies to.

It is important to note that in any scenario described herein involving the collection and/or use of data or information related to a user's actions or activities, such as in the examples described above, the user may be given the option to not have such data or information collected and/or used in any way. For example, a user may be provided with an opportunity to opt in/out of programs or features that involve using data or information about a user's activity and/or collecting personal information, such as information about the user's geographic location, e-mail or other messaging contents, and the like.

Client content manager 445 may detect, generate, or obtain data about user action with regard to recommended content 402 and send the user action data along with content ID 404 to content management server 410. In at least some embodiments, the content ID sent with the user action data 404 identifies the content item to which the user's action relates. The content management server 410 may then log or store the user action data with the content ID 406 in one or more user action logs 488.

In one arrangement, the user action logs 488 may push or otherwise provide the content ID, an action ID and an action timestamp 408 to social network application server 415, while in another arrangement the social network application server 415 may request or retrieve these items of data. In either such arrangement, the action ID may identify one or more actions corresponding to the user action data 406 logged in the user action logs 488, and the action timestamp may identify a specific time or time period associated with such actions. The social network application server 415 may use the content ID, action ID, and action timestamp 408 to map one or more of the user actions to one or more parsed components of the content item that was recommended 410.

Figure 6:
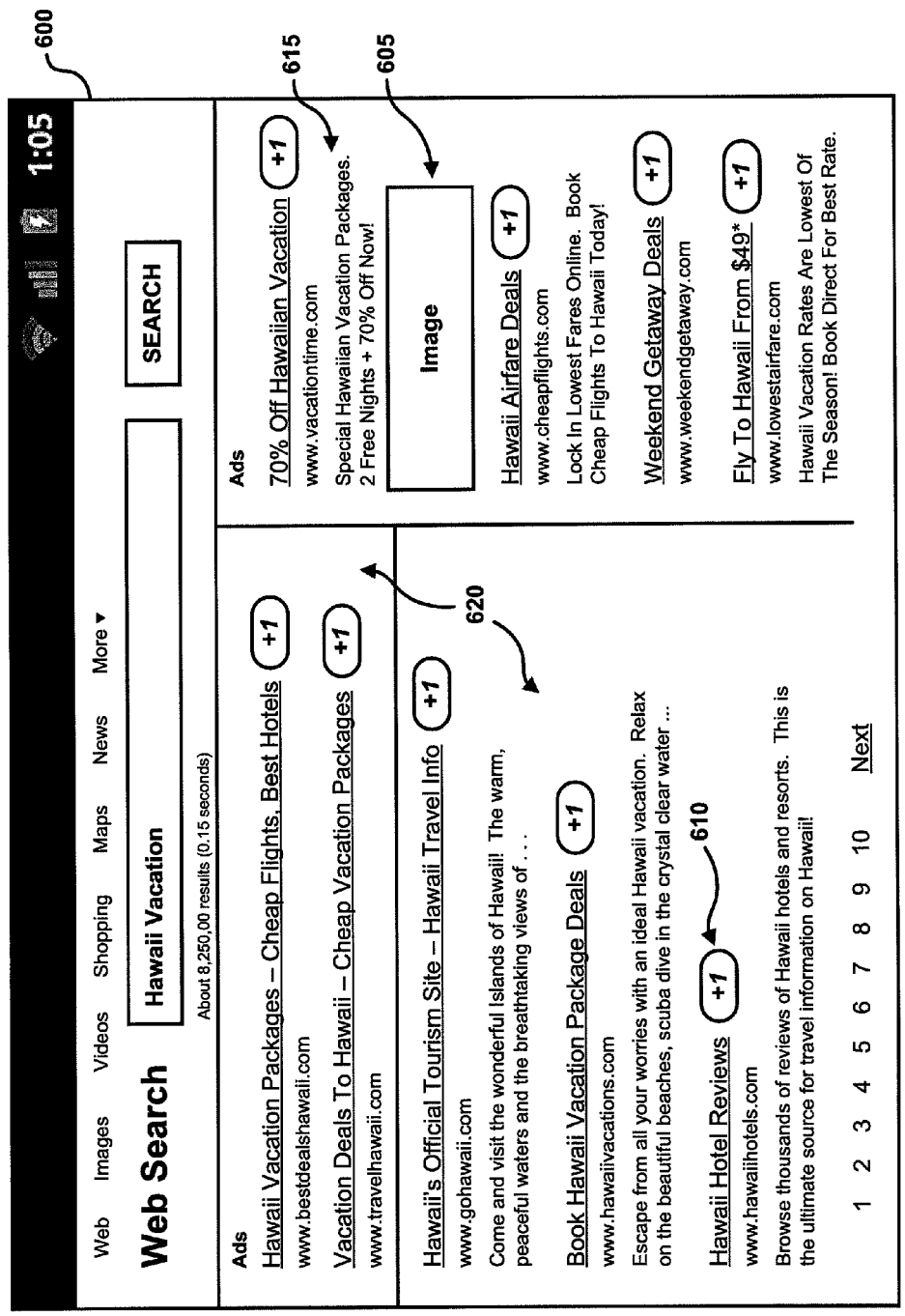
FIG. 6 is an example user interface that includes content items along with a user recommendation control according to one or more embodiments described herein.
Figure 7:
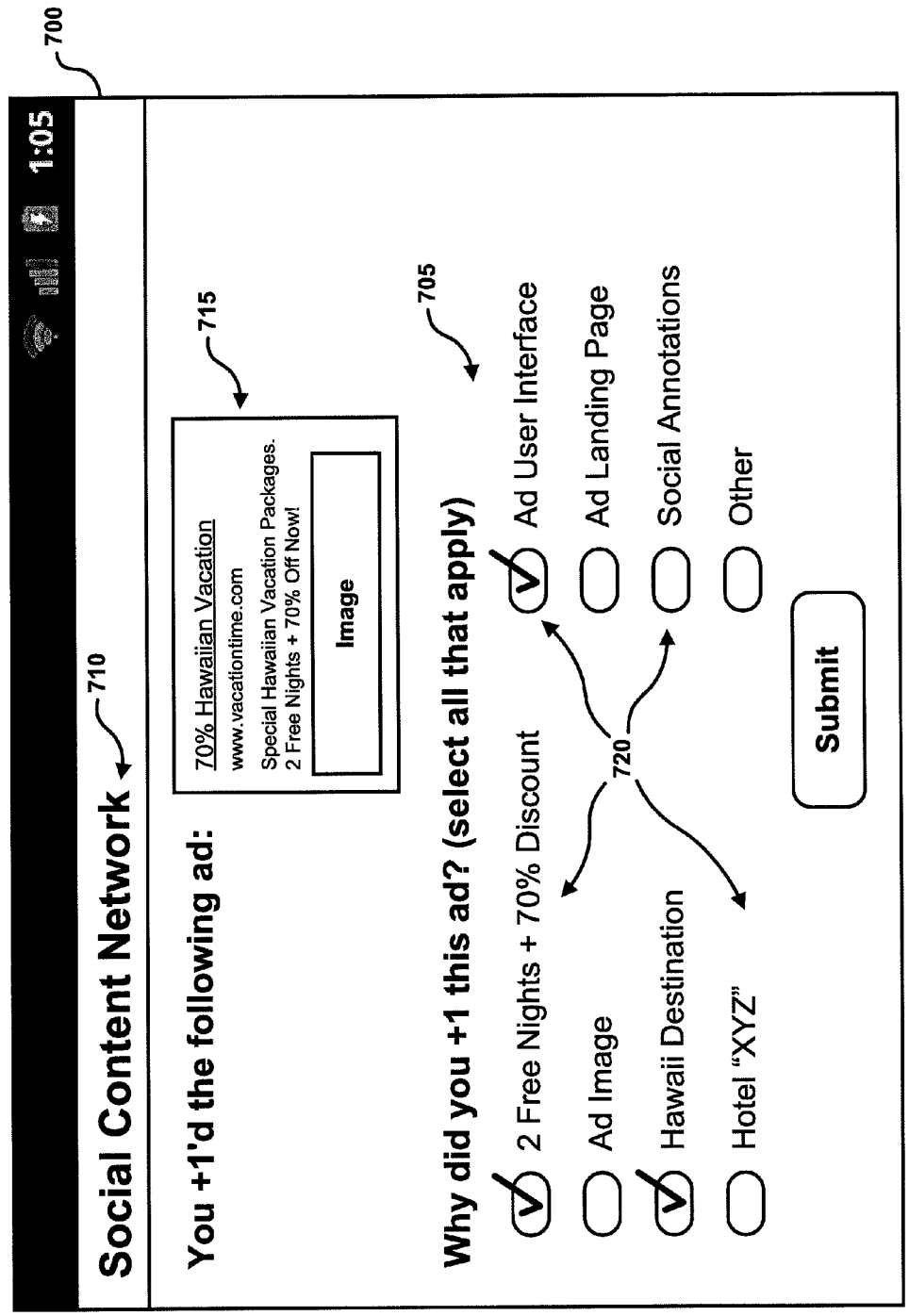
FIG. 7 is an example user interface that includes a recommendation intent query for a user to designate one or more components of content that the user intended to recommend according to one or more embodiments described herein.
Figure 8:
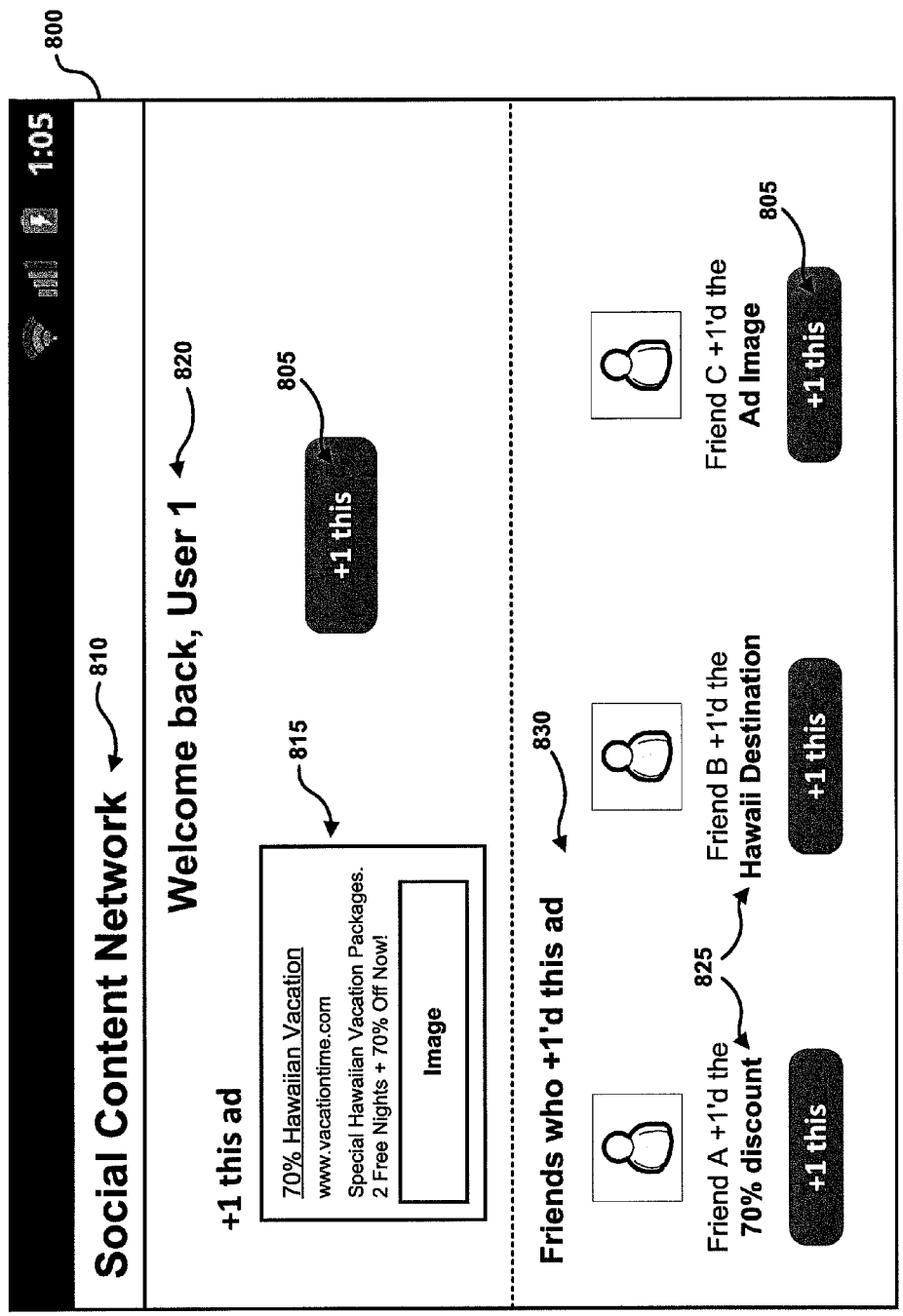
FIG. 8 is an example user interface that includes a content item for a user to recommend and also identifies other users who have recommended specific components of the content item according to one or more embodiments described herein.

FIGS. 6-8 illustrate example user interfaces that may be used in implementing any of the various methods and systems described herein. Various features and components of the illustrative user interfaces presented in FIGS. 6-8 are described in the context of an example scenario involving a content search using the search terms "Hawaii Vacation," as shown in search box 625 contained in user interface 600 of FIG. 6. It should be understood that this particular scenario, including the example search terms, results, and other content shown in FIGS. 6-8, are for illustrative purposes only, and are not in any way intended to limit the scope of the present disclosure.

FIG. 6 shows an example user interface 600 that includes hyperlinks to content, such as web pages and advertisements (e.g., promotional content), presented in a search results listing 620 where the hyperlinked web pages and advertisements are each presented in conjunction with a user recommendation control 610. In at least the example user interface 600 illustrated in FIG. 6, the user recommendation control 610 is represented as a button with a "+1" symbol located in the middle of it. It should be understood that the user recommendation control 610 may be represented in numerous other ways in addition to or instead of the "+1" button shown in FIG. 6, and that the use of such an icon is not in any way intended to limit the scope of the disclosure.

Additionally, at least a portion of example user interface 600 may be dedicated to displaying promotional content, such as advertisement 615. In at least some scenarios, the advertisement 615 may include one or more images 605 as component(s) of the advertisement 615. Also, the advertisement 615 may be presented for display in user interface 600 in conjunction with a user recommendation control 610.

FIG. 7 shows an example user interface 700 associated with a social content network 710 (e.g., a social content network associated with social network application 150 shown in FIG. 1) where the user interface 700 includes an advertisement 715 recommended by a user presented along with a recommendation intent query 705 (e.g., recommendation questionnaire). In some embodiments of the disclosure, the recommendation intent query 705 may be presented as part of the user interface 700, such as in the example arrangement shown in FIG. 7. In other embodiments, the recommendation intent query 705 may be presented in a separate user interface overlaid on a different, or previous, user interface (e.g., user interface 600 shown in FIG. 6). In such embodiments, the separate, overlaid user interface containing the recommendation intent query 705 may be of smaller dimensions than the underlying user interface, such that at least a portion of the underlying user interface remains visible.

In at least the example user interface 700, the recommendation intent query 705 includes a list of components 720 of the recommended advertisement 715. According to some embodiments described herein, a user may make a selection corresponding to one or more of the components 720 of the recommended advertisement 715 (identified by check-marks in the example user interface shown in FIG. 7) to which the user's recommendation applies to. For example, a selection corresponding to three components of the recommended advertisement 715 is illustrated in the example user interface 700.

FIG. 8 shows an example user interface 800 that includes a content item for the user 820 to recommend and also identifies other users 830 in a social network who have recommended particular components of the content. The content item in example user interface 800 is an advertisement 815, presented in conjunction with a user recommendation control 805 configured for the user 820 to interact with in order to make a recommendation of the advertisement 815. Also, included in user interface 800 are social annotations 825 about other users 830 in a social network of the user 820 who have recommended the advertisement 815. In accordance with embodiments of the disclosure described above, the social annotations 825 include details about certain components of the advertisement 815 that each of the other users 830 recommended.

Figure 9:
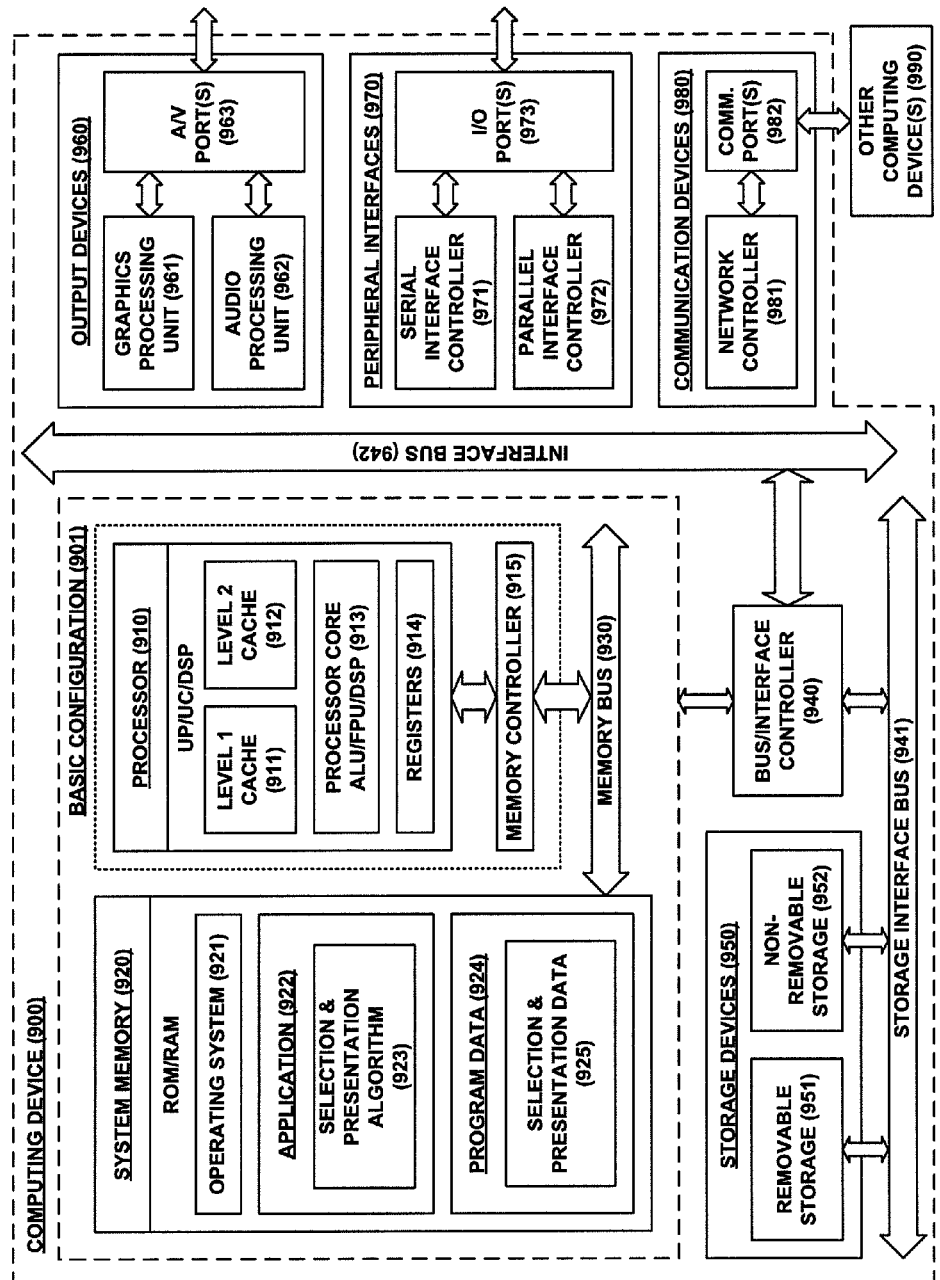
FIG. 9 is a block diagram illustrating an example computing device arranged for selecting and presenting content according to one or more embodiments described herein.

FIG. 9 is a block diagram illustrating an example computing device 900 that is arranged for selecting and presenting an item of content (e.g., a web page, an advertisement, etc.) to a user or user device in accordance with one or more embodiments of the present disclosure. In a very basic configuration 901, computing device 900 typically includes one or more processors 910 and system memory 920. A memory bus 930 may be used for communicating between the processor 910 and the system memory 920.

Depending on the desired configuration, processor 910 can be of any type including but not limited to a microprocessor (μP), a microcontroller (μC), a digital signal processor (DSP), or any combination thereof. Processor 910 may include one or more levels of caching, such as a level one cache 911 and a level two cache 912, a processor core 913, and registers 914. The processor core 913 may include an arithmetic logic unit (ALU), a floating point unit (FPU), a digital signal processing core (DSP Core), or any combination thereof. A memory controller 915 can also be used with the processor 910, or in some embodiments the memory controller 915 can be an internal part of the processor 910.

Depending on the desired configuration, the system memory 920 can be of any type including but not limited to volatile memory (e.g., RAM), non-volatile memory (e.g., ROM, flash memory, etc.) or any combination thereof. System memory 920 typically includes an operating system 921, one or more applications 922, and program data 924. In at least some embodiments, application 922 includes a selection and presentation algorithm 923 that is configured to select a content item, and provide that content item to a user device for presentation to a user. The selection and presentation algorithm is further arranged to identify annotations (e.g., content associated with a social network of a user) for presentation to a user along with the selected content item.

Program Data 924 may include selection and presentation data 925. In some embodiments, application 922 can be arranged to operate with program data 924 on an operating system 921 such that a request made by a user of a user device (e.g., user device 105 shown in FIG. 1) is routed via a social network application (e.g., social network application 150 shown in FIG. 1), which acts as a proxy for transmitting such requests to an appropriate server.

Computing device 900 can have additional features and/or functionality, and additional interfaces to facilitate communications between the basic configuration 901 and any required devices and interfaces. For example, a bus/interface controller 940 can be used to facilitate communications between the basic configuration 901 and one or more data storage devices 950 via a storage interface bus 941. The data storage devices 950 can be removable storage devices 951, non-removable storage devices 952, or any combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), tape drives and the like. Example computer storage media can include volatile and nonvolatile, removable and non-removable media implemented in any method or technology for storage of information, such as computer readable instructions, data structures, program modules, and/or other data.

System memory 920, removable storage 951 and non-removable storage 952 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media can be part of computing device 900.

Computing device 900 can also include an interface bus 942 for facilitating communication from various interface devices (e.g., output interfaces, peripheral interfaces, communication interfaces, etc.) to the basic configuration 901 via the bus/interface controller 940. Example output devices 960 include a graphics processing unit 961 and an audio processing unit 962, either or both of which can be configured to communicate to various external devices such as a display or speakers via one or more A/V ports 963. Example peripheral interfaces 970 include a serial interface controller 971 or a parallel interface controller 972, which can be configured to communicate with external devices such as input devices (e.g., keyboard, mouse, pen, voice input device, touch input device, etc.) or other peripheral devices (e.g., printer, scanner, etc.) via one or more I/O ports 973. An example communication device 980 includes a network controller 981, which can be arranged to facilitate communications with one or more other computing devices 990 over a network communication (not shown) via one or more communication ports 982. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 900 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 900 can also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost versus efficiency trade-offs. There are various vehicles by which processes and/or systems and/or other technologies described herein can be effected (e.g., hardware, software, and/or firmware), and the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation. In one or more other scenarios, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

In one or more embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments described herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof. Those skilled in the art will further recognize that designing the circuitry and/or writing the code for the software and/or firmware would be well within the skill of one of skilled in the art in light of the present disclosure.

Additionally, those skilled in the art will appreciate that the mechanisms of the subject matter described herein are capable of being distributed as a program product in a variety of forms, and that an illustrative embodiment of the subject matter described herein applies regardless of the particular type of signal-bearing medium used to actually carry out the distribution. Examples of a signal-bearing medium include, but are not limited to, the following: a recordable-type medium such as a floppy disk, a hard disk drive, a Compact Disc (CD), a Digital Video Disk (DVD), a digital tape, a computer memory, etc.; and a transmission-type medium such as a digital and/or an analog communication medium (e.g., a fiber optic cable, a waveguide, a wired communications link, a wireless communication link, etc.).

Those skilled in the art will also recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method for refining a content recommendation made by a user, the method comprising:
   receiving, through a user interface of a social network application installed on a user device, an indication that a user recommended content displayed in a web browser on the user device, wherein the recommended content includes a plurality of different content components corresponding to different portions of the recommended content;
   responsive to receiving the indication that the user recommended content displayed in the web browser, retrieving candidate annotations that describe characteristics of each of the plurality of different content components;
   updating the user interface presented at the user device with a request for the user to select at least one of the candidate annotations for at least one of the plurality of content components;
   receiving, through the social network application, a user selection of at least one of the candidate annotations as an annotation for at least one of the plurality of content components; and
   distributing through a social network the user recommended content with the selected at least one candidate annotation at a presentation location corresponding to the at least one content component of the recommended content.

2. The method of claim 1, wherein presenting the user with a request for the user to select at least one of the plurality of content components of the recommended content applicable to the recommendation includes:
   displaying, in the social network application, the recommended content, a plurality of user-selectable options each corresponding to a different one of the plurality of content components of the recommended content, and a prompt for the user to select at least one of the plurality of content components of the recommended content applicable to the recommendation.

3. The method of claim 1, further comprising:
   responsive to receiving the indication that the user recommended content displayed in the web browser, the social network application sending to a server, in communication with the user device over a network, data identifying the content recommended by the user; and
   receiving at the social network application, from the server, data corresponding to the plurality of content components of the recommended content.

4. The method of claim 3, wherein the data corresponding to the plurality of content components of the recommended content includes a user interface screen generated by the server based on a component reference table stored for the recommended content, the user interface screen including the recommended content, a plurality of user-selectable options each corresponding to a different one of the plurality of content components of the recommended content, and a prompt for the user to select at least one of the plurality of content components of the recommended content applicable to the recommendation.

5. The method of claim 4, wherein presenting the user with a request for the user to select at least one of the plurality of content components of the recommended content applicable to the recommendation includes displaying, in the social network application, the user interface screen generated by the server.

6. The method of claim 1, further comprising:
responsive to receiving the selection of at least one of the plurality of content components of the recommended content applicable to the recommendation made by the user, the social network application sending to a server, in communication with the user device over a network, data identifying the at least one content component of the recommended content selected by the user; and
receiving at the social network application, from the server, an annotation for display in the social network application, the annotation indicating the at least one content component of the recommended content to which the recommendation of the user applies.

7. The method of claim 1, further comprising serving, via a network, the generated annotation to a user device of another user for display in conjunction with the recommended content.

8. The method of claim 1, wherein the content includes one or both of a web page and a promotional content item.

9. The method of claim 1, wherein the indication that the user recommended the content is an indication that the user recommended a uniform resource locator (URL) associated with the content.

10. The method of claim 1, wherein the indication that the user recommended content is an indication that the user selected a user recommendation control displayed in conjunction with the content.

11. The method of claim 6, wherein the data identifying the at least one content component of the recommended content selected by the user is sent by the social network application to the server as encrypted data.

12. A method for refining a content recommendation made by a user, the method comprising:
receiving, through a user interface of a social network application installed on a user device, an indication that a user recommended content displayed in a web browser on the user device, wherein the recommended content includes a plurality of different content components corresponding to different portions of the recommended content;
responsive to receiving the indication that the user recommended content displayed in the web browser, retrieving candidate annotations that describe characteristics of each of the plurality of different content components;
updating the user interface presented at the user device with a request for the user to select at least one of the candidate annotations for at least one of the plurality of content components;
receiving, through the social network application, a user selection of at least one of the candidate annotations as an annotation for at least one of the plurality of content components; and
distributing through a social network the user recommended content with the selected at least one candidate annotation at a presentation location corresponding to the at least one content component of the recommended content.

13. The method of claim 12, further comprising:
serving via a network, the at least one annotation to another user device for display in conjunction with the recommended content.

14. The method of claim 12, wherein determining that the recommendation made by the user applies to a specific one or more of the plurality of content components of the recommended content includes:
determining, from a component reference table stored for the recommended content, one or more content components of the recommended content mapped to the at least one action performed by the user.

15. The method of claim 12, further comprising updating, by the server, one or more user action logs based on the received data about the at least one action performed by the user and the content recommended by the user.

16. The method of claim 12, wherein the content includes one or both of a web page and a promotional content item.

17. The method of claim 12, wherein the indication that the user recommended the content is an indication that the user recommended a uniform resource locator (URL) associated with the content.

18. The method of claim 12, wherein the indication that the user recommended content is an indication that the user selected a user recommendation control displayed in conjunction with the content.

19. The method of claim 12, wherein the data about at least one action performed by the user in connection with the recommended content is received at the server as encrypted data.

20. A system for identifying a component of content recommended by a user, the system comprising:
at least one processor; and
a computer-readable medium coupled to the at least one processor having instructions stored thereon which, when executed by the at least one processor, causes the at least one processor to:
receive, through a user interface of a social network application installed on a user device, an indication that a user recommended content displayed in a web browser on the user device, wherein the recommended content includes a plurality of different content components corresponding to different portions of the recommended content;
responsive to receiving the indication that the user recommended content displayed in the web browser, retrieve candidate annotations that describe characteristics of each of the plurality of different content components;
update the user interface presented at the user device with a request for the user to select at least one of the candidate annotations for at least one of the plurality of content components;
receive, through the social network application, a user selection of at least one of the candidate annotations as an annotation for at least one of the plurality of content components; and
distribute through a social network the user recommended content with the selected at least one candidate annotation at a presentation location corresponding to the at least one content component of the recommended content.

21. The system of claim 20, wherein the at least one processor is further caused to:
display, in the social network application, the recommended content, a plurality of user-selectable options each corresponding to a different one of the plurality of content components of the recommended content, and a prompt for the user to select at least one of the plurality of content components of the recommended content applicable to the recommendation.

22. The system of claim 20, wherein the at least one processor is further caused to:
responsive to receiving the indication that the user recommended content displayed in the web browser, send to a server, in communication with the user device over a network, data identifying the content recommended by the user; and
receive from the server, data corresponding to the plurality of content components of the recommended content.

23. The system of claim 22, wherein the data corresponding to the plurality of content components of the recommended content includes a user interface screen generated by the server based on a component reference table stored for the recommended content, the user interface screen including the recommended content, a plurality of user-selectable options each corresponding to a different one of the plurality of content components of the recommended content, and a prompt for the user to select at least one of the plurality of content components of the recommended content applicable to the recommendation.

24. The system of claim 23, wherein the at least one processor is further caused to:
display, in the social network application, the user interface screen generated by the server.

25. The system of claim 20, wherein the at least one processor is further caused to:
responsive to receiving the selection of at least one of the plurality of content components of the recommended content applicable to the recommendation made by the user, send to a server in communication with the user device over a network data identifying the at least one content component of the recommended content selected by the user; and
receive, from the server, an annotation for display in the social network application, the annotation indicating the at least one content component of the recommended content to which the recommendation of the user applies.

26. The system of claim 20, wherein the at least one processor is further caused to:
provide, via a network, the generated annotation to a user device of another user for display in conjunction with the recommended content.

27. The system of claim 20, wherein the content includes one or both of a web page and a promotional content item.

28. The system of claim 20, wherein the indication that the user recommended the content is an indication that the user recommended a uniform resource locator (URL) associated with the content.

29. The system of claim 20, wherein the indication that the user recommended content is an indication that the user selected a user recommendation control displayed in conjunction with the content.

30. The system of claim 25, wherein the data identifying the at least one content component of the recommended content selected by the user is sent to the server as encrypted data.

31. A system for refining a content recommendation made by a user, the system comprising:
at least one processor; and
a computer-readable medium coupled to the at least one processor having instructions stored thereon which, when executed by the at least one processor, causes the at least one processor to:
receive, through a user interface of a social network application installed on a user device, an indication that a user recommended content displayed in a web browser on the user device, wherein the recommended content includes a plurality of different content components corresponding to different portions of the recommended content;
responsive to receiving the indication that the user recommended content displayed in the web browser, retrieve candidate annotations that describe characteristics of each of the plurality of different content components;
update the user interface presented at the user device with a request for the user to select at least one of the candidate annotations for at least one of the plurality of content components;
receive, through the social network application, a user selection of at least one of the candidate annotations as an annotation for at least one of the plurality of content components; and
distribute through a social network the user recommended content with the selected at least one candidate annotation at a presentation location corresponding to the at least one content component of the recommended content.

32. The system of claim 31, wherein the at least one processor is further caused to:
send, via a network, the at least one annotation to another user device for display in conjunction with the recommended content.

33. The system of claim 31, wherein the at least one processor is further caused to:
determine, from a component reference table stored for the recommended content, one or more content components of the recommended content mapped to the at least one action performed by the user.

34. The system of claim 31, wherein the at least one processor is further caused to:
update one or more user action logs based on the received data about the at least one action performed by the user and the content recommended by the user.

35. The system of claim 31, wherein the content includes one or both of a web page and a promotional content item.

36. The system of claim 31, wherein the indication that the user recommended the content is an indication that the user recommended a uniform resource locator (URL) associated with the content.

37. The system of claim 31, wherein the indication that the user recommended content is an indication that the user selected a user recommendation control displayed in conjunction with the content.

38. The system of claim 31, wherein the data about at least one action performed by the user in connection with the recommended content is received as encrypted data.

* * * * *